United States Patent
Espelien et al.

(10) Patent No.: US 10,844,860 B2
(45) Date of Patent: Nov. 24, 2020

(54) METHOD OF IMPROVED CONTROL FOR VARIABLE VOLUME RATIO VALVE

(71) Applicant: TRANE INTERNATIONAL INC., Davidson, NC (US)

(72) Inventors: Christopher Espelien, Holmen, WI (US); Scott M. Branch, Tomah, WI (US)

(73) Assignee: Trane International Inc., Davidson, NC (US)

( * ) Notice: Subject to any disclaimer, the term of this patent is extended or adjusted under 35 U.S.C. 154(b) by 124 days.

(21) Appl. No.: 16/230,688

(22) Filed: Dec. 21, 2018

(65) Prior Publication Data

US 2020/0200175 A1    Jun. 25, 2020

(51) Int. Cl.
*F04C 28/18* (2006.01)
*F25B 49/02* (2006.01)
*F25B 1/02* (2006.01)

(52) U.S. Cl.
CPC ............ *F04C 28/18* (2013.01); *F25B 1/02* (2013.01); *F25B 49/022* (2013.01); *F25B 2600/25* (2013.01); *F25B 2700/1933* (2013.01); *F25B 2700/2113* (2013.01)

(58) Field of Classification Search
CPC .... F04C 28/18; F25B 49/022; F25B 2600/02; F25B 2600/023; F25B 2600/025; F25B 2600/0261; F25B 2700/13; F25B 2700/171; F25B 2700/1933; F25B 2700/21151
See application file for complete search history.

(56) References Cited

U.S. PATENT DOCUMENTS

| 3,054,273 | A | * | 9/1962 | McGrath | F25B 41/062 62/115 |
|---|---|---|---|---|---|
| 6,945,062 | B2 | | 9/2005 | Chen et al. | |
| 2006/0144059 | A1 | | 7/2006 | Kang et al. | |
| 2008/0253914 | A1 | * | 10/2008 | Kubota | F04C 18/16 418/104 |
| 2009/0277197 | A1 | | 11/2009 | Gambiana et al. | |
| 2010/0005831 | A1 | * | 1/2010 | Vaisman | F25B 13/00 62/470 |
| 2010/0101248 | A1 | | 4/2010 | Lifson | |

(Continued)

FOREIGN PATENT DOCUMENTS

| CN | 205064274 U | 3/2016 |
|---|---|---|
| JP | H06341378 A | 12/1994 |

OTHER PUBLICATIONS

Extended European Search Report, European Patent Application No. 19215437.5, dated Mar. 31, 2020 (6 pages).

*Primary Examiner* — Jonathan Bradford
(74) *Attorney, Agent, or Firm* — Hamre, Schumann, Mueller & Larson, P.C.

(57) ABSTRACT

Variable volume ratio compressors may be controlled using a switching parameter based on compressor speed and suction density to improve the matching of compressor volume ratio to desired discharge conditions. Delay periods may be implemented in the determination of when to change volume ratio to control the frequency of changes to the volume ratio. The switching parameter may be a product of the compressor speed and suction density. The volume ratio of the compressor may be controlled by switching valves directing pressure to a piston of a variable volume ratio system of the compressor.

19 Claims, 3 Drawing Sheets

(56) References Cited

U.S. PATENT DOCUMENTS

| | | | |
|---|---|---|---|
| 2013/0025305 A1* | 1/2013 | Higashiiue | F25B 31/004 |
| | | | 62/115 |
| 2013/0032220 A1* | 2/2013 | Cording | B60H 1/00585 |
| | | | 137/15.04 |
| 2014/0360218 A1* | 12/2014 | Takenaka | F25B 1/10 |
| | | | 62/324.6 |
| 2015/0007591 A1 | 1/2015 | Liu et al. | |
| 2015/0093237 A1 | 4/2015 | Delvaux | |
| 2017/0234582 A1* | 8/2017 | Hatomura | F25B 13/00 |
| | | | 62/160 |

* cited by examiner

METHOD OF IMPROVED CONTROL FOR VARIABLE VOLUME RATIO VALVE

FIELD

This disclosure is directed to methods and systems for controlling valves governing the volume ratio of a variable volume ratio compressor. Particularly, this disclosure is directed to controlling the volume ratio of a compressor based on compressor mass flow, determined through inputs such as suction density and compressor speed.

BACKGROUND

Compressors can incorporate hardware allowing the volume ratio of the compressor to be adjusted. Changing the volume ratio of a compressor affects the conditions at the discharge of the compressor. Changes to the volume ratio can affect compressor performance under partial load conditions, increasing or decreasing the efficiency of the compressor at partial and full loads depending on whether the volume ratio is properly selected for a set of operating conditions of the compressor.

SUMMARY

This disclosure is directed to methods and systems for controlling valves governing the volume ratio of a variable volume ratio compressor. Particularly, this disclosure is directed to controlling the volume ratio of a compressor based on compressor mass flow, determined through inputs such as suction density and compressor speed.

Variable volume ratio compressors allow the volume ratio to be changed between at least two settings, which can improve matching of compressor discharge conditions to pressure conditions at a condenser of a refrigerant circuit that includes the compressor so as to increase efficiency.

Under some conditions, for example when the compressor is operating close to the switching conditions, automated switching of volume ratios may occur at high frequencies. Such high-frequency switching could create additional wear on the variable volume ratio system components. Delay periods may be incorporated into determining and implementing changes to the volume ratio, providing more consistent operation over time and reducing potentially excessive changes in the volume ratio of the compressor.

In an embodiment, a compressor system includes a variable volume ratio compressor configured to be operated at one of a plurality of different volume ratios and having a suction. The compressor system also includes a controller. The controller is configured to obtain a speed of operation of the variable volume ratio compressor and a refrigerant density at the suction of the variable volume ratio compressor. The controller is also configured to determine a switching parameter based on the speed of operation and the refrigerant density. The controller is further configured to determine whether to change a volume ratio of the variable volume ratio compressor based on a switching condition and the switching parameter. When the controller determines that the volume ratio is to be changed, the controller directs a change in the volume ratio that the variable volume ratio compressor is operated at.

In an embodiment, the plurality of different volume ratios is two different volume ratios.

In an embodiment, the compressor system includes one or more sensors located at the suction of the variable volume ratio compressor, and the controller obtains the refrigerant density based on outputs from the one or more sensors.

In an embodiment, the outputs from the one or more sensors include a suction pressure and a suction temperature.

In an embodiment, the switching parameter determined by the controller is a product of the speed of operation and the refrigerant density.

In an embodiment, the switching condition is a linear function of the speed of operation and the refrigerant density.

In an embodiment, the compressor system includes a piston, a first valve, and a second valve. The first valve is configured to communicate the piston with a first pressure, the second valve is configured to communicate the piston with a second pressure, different than the first pressure, and the piston is configured to be positioned by a received pressure. In an embodiment, the first pressure is a pressure at the suction of the variable volume ratio compressor and the second pressure is a pressure at an intermediate point of the variable volume ratio compressor. In an embodiment, the controller directs the change in the volume ratio that the variable volume ratio compressor is operated at by directing each of the first valve and the second valve to change positions.

A method embodiment for controlling a variable volume ratio compressor includes obtaining a suction density and an operating speed of the variable volume ratio compressor. The method further includes determining a switching parameter based on the suction density and the operation speed. The method also includes determining whether to change a volume ratio of the variable volume ratio compressor, and changing the volume ratio of the variable volume ratio compressor when it is determined to that the volume ratio of the variable volume ratio compressor is to be changed. In an embodiment, the switching parameter is a function of a suction density of the variable-volume ratio compressor and an operation speed of the compressor.

In an embodiment, determining the switching parameter includes determining the switching parameter at a first time, waiting a switching parameter delay period, and determining the switching parameter at a second time, and determining whether to change the volume ratio of the variable volume ratio compressor is based on the switching parameter determined at the second time. In an embodiment, the switching parameter delay period is approximately five (5) minutes.

In an embodiment, the method includes waiting a volume ratio change delay period after changing a volume ratio of the compressor. In an embodiment, the volume ratio change delay period is approximately fifteen (15) minutes.

In an embodiment, the switching parameter is a product of the suction density and the operating speed of the variable volume ratio compressor.

In an embodiment, the switching condition is a linear function of the product of the suction density and the operating speed of the variable volume compressor.

In an embodiment, changing the volume ratio of the variable volume ratio compressor includes switching the variable volume ratio compressor from a first volume ratio to a second volume ratio by changing the position of each of a first and a second valve, where the first valve is in fluid communication with a first pressure and the second valve is in fluid communication with a second pressure, different from the first pressure. In an embodiment, the first pressure is a suction pressure of the variable volume ratio compressor, and the second pressure is an intermediate pressure within the variable volume ratio compressor. In an embodiment, the first valve and the second valve are configured to provide one of either the first pressure or the second pressure to a piston within the variable volume ratio compressor.

DRAWINGS

DETAILED DESCRIPTION

This disclosure is directed to methods and systems for controlling valves governing the volume ratio of a variable volume ratio compressor. Particularly, this disclosure is directed to controlling the volume ratio of a compressor based on compressor suction density and speed.

Figure 1:
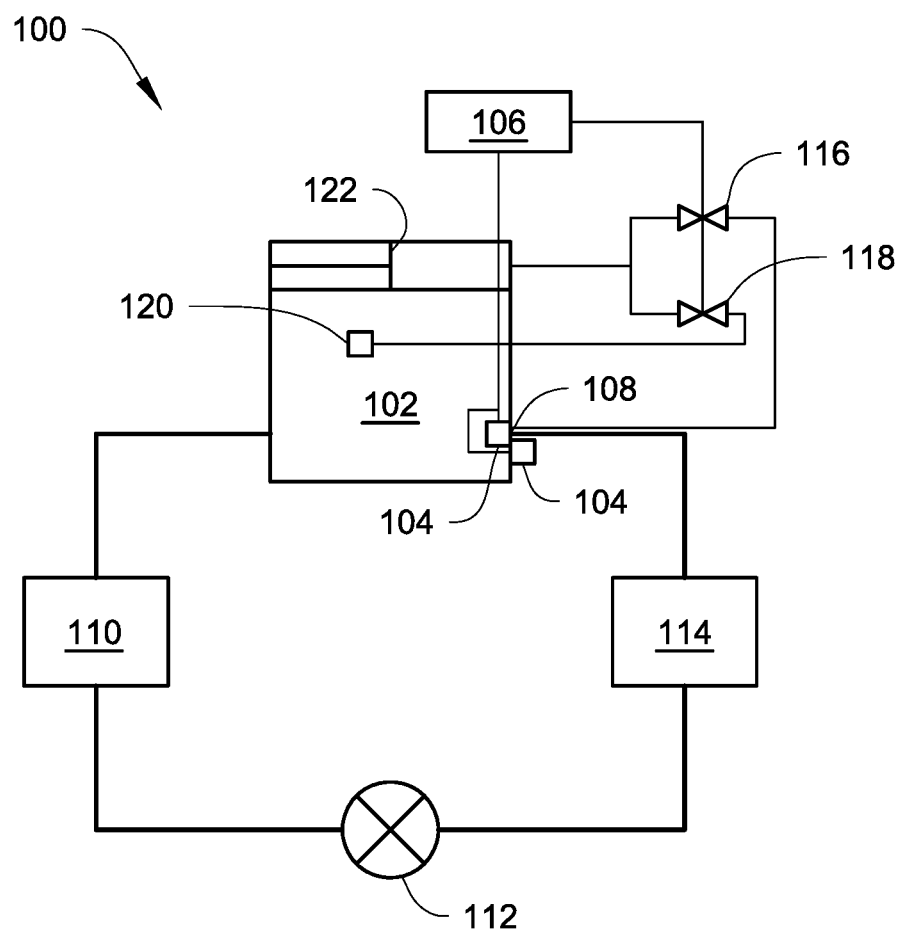
FIG. 1 shows a compressor system and a refrigerant circuit according to an embodiment.

FIG. 1 shows a compressor system 100 according to an embodiment. Compressor system 100 includes variable-volume compressor 102, one or more sensors 104 at or near suction 108 of compressor 102, and controller 106. Compressor 102 is incorporated into a refrigerant circuit including condenser 110, expansion device 112, and evaporator 114. In an embodiment, controller 106 is operatively connected to solenoid valves 116, 118, that control whether pressure from compressor suction 108 or intermediate point 120 act on piston 122 of compressor 102 to adjust the volume ratio of compressor 102.

Compressor 102 is a variable volume compressor configured to be operated at a plurality of different volume ratios. The variable volume ratio compressor 102 is operated at a volume ratio that may be determined by controller 106. The volume ratio may be changed by a variable volume ratio system. In an embodiment, compressor 102 is configured to be operated at two different volume ratios. In an embodiment, compressor 102 switches between the two volume ratios by movement of piston 122. In an embodiment, piston 122 is controlled by varying the pressure applied to the piston 122 between either a suction pressure of the compressor as suction 108 or an intermediate oil pressure at an intermediate point 120 within the compressor. While the embodiment shown in FIG. 1 is directed to piston 122 controlled by application of suction or intermediate pressure, it is appreciated that other variable volume ratio systems of compressors may be used. In an embodiment, compressor 102 is configured to change between different volume ratios by operation of a slide valve. In an embodiment, the volume ratio of compressor 102 is changed by operation of a stepper motor. In an embodiment, the volume ratio of compressor 102 is continuously variable across a range of volume ratio states.

The one or more sensors 104 are configured to obtain the density of refrigerant at the suction 108 of compressor 102, alone or in combination with controller 106. The one or more sensors 104 may be located at or near suction 108 of compressor 102.

Controller 106 is configured to determine a switching parameter based on the density of refrigerant at suction 108 and the speed at which compressor 102 is operated. Controller 106 may obtain the density of the refrigerant, for example, from the one or more sensors 104, or by determining the suction density from values reported by the one or more sensors 104. The suction density is a density of the refrigerant at the suction 108 of compressor 102. Controller 106 may obtain the compressor speed from a sensor included in compressor 102, or from a controller directing the operation of compressor 102. Controller 106 may be configured to determine the switching parameter multiple times, implement delays between determination of the switching parameter, implement delays between changing the volume ratio of the compressor and determining the switching parameter, or other such operations affecting the frequency at which volume ratio changes may be performed. The switching parameter may be a product of the suction density and the speed of compressor 102.

Controller 106 is further configured to determine whether to change a volume ratio of compressor 102 based on the switching parameter and the switching condition. The switching condition may be, for example, a pressure ratio criterion. The pressure ratio criterion may provide a threshold value used to determine whether to switch the volume ratio of compressor 102. The pressure ratio criteria may be specific to components of the compressor system 100, such as compressor 102, and the refrigerant used in the refrigeration circuit of the compressor system 100. In an embodiment, the pressure ratio criterion is a linear function of the product of the suction density and the compressor speed. The switching parameter may be compared to the switching condition at controller 106, and whether to change the volume ratio of the compressor 102 may be determined via that comparison.

Controller 106 is further configured to direct compressor 102 to change a volume ratio. Controller 106 may be configured to direct compressor 102 to change the volume ratio based on the switching parameter and the switching condition. In an embodiment, controller 106 is operatively connected to a first solenoid valve 116 and a second solenoid valve 118 and configured to direct their operation. The first solenoid valve 116 may be a valve in fluid communication with the suction of the compressor and is capable of applying the pressure at suction 108 of compressor 102 to the piston 122 of compressor 102. The second solenoid valve 118 may be a valve in fluid communication with an intermediate point 120 within compressor 102, and capable of providing the pressure at that intermediate point 120 to the piston 122. The pressure at suction 108 or intermediate point 118 drive the piston to a particular position, changing the volume ratio of the compressor 102. The controller 106 may switch the first solenoid valve 116 to a closed position and the second solenoid valve 118 to an open position, or vice versa, to switch the compressor 102 between two different volume ratios.

Compressor 102 may be included in a refrigerant circuit including condenser 110, expansion device 112, and evaporator 114. Refrigerant compressed and discharged by compressor 102 may be directed to condenser 110, then from condenser 110 to expansion device 112. Expansion device 112 is a device configured to expand and lower a pressure of a fluid, such as an expansion valve, an orifice, or the like. Refrigerant expanded at expansion device 112 passes to evaporator 114, then returns to compressor 102 at compressor suction 108. The refrigerant circuit may use any refrigerant, such as, for example, refrigerant R134(a), refrigerant R1234ze(E), or any other suitable refrigerant.

Figure 2:
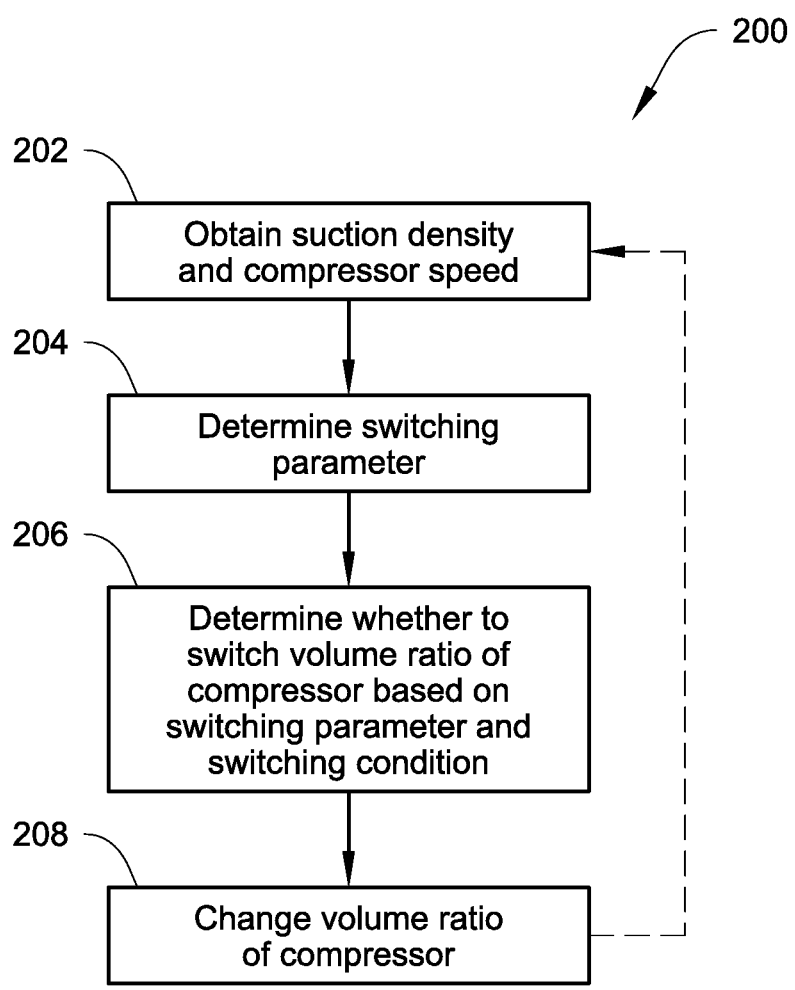
FIG. 2 shows a flowchart of a method for controlling a compressor system according to an embodiment.

FIG. 2 shows a flowchart of a method 200 for determining when to switch a volume ratio of a compressor according to an embodiment. Method 200 includes obtaining a suction density and a compressor speed 202, determining a switching parameter based on compressor speed and suction density at 204, determining whether to switch a volume ratio of the compressor based on the switching parameter and a switching condition 206, and changing the volume ratio of the compressor when it is determined that the volume ratio of the compressor is to be switched 208.

A suction density and the compressor speed are obtained 202. The suction density is the density of the refrigerant at the suction port of the compressor. The suction density may be obtained from one or more sensors located at or near a suction port of the compressor. The suction density may be measured directly, or computed from the outputs of the one or more sensors. In an embodiment, the suction density is computed based on a suction pressure and a suction temperature measured by sensors, and the particular refrigerant used with the compressor. For each refrigerant, the suction pressure and temperature are related to the suction density by a function specific to that refrigerant, for example due to differences in the properties of the refrigerant and its behavior as a gas. The compressor speed may be obtained from a controller of the compressor, a drive of the compressor such as a variable-frequency drive, or measured at the compressor.

The switching parameter is determined based on the compressor speed and the suction density 204. The switching parameter is a function of both the compressor speed and the suction density. In an embodiment, the switching parameter is a product of the compressor speed and the suction density. In an embodiment, the switching parameter is a mass flow rate. The mass flow rate may be determined based on the volume flow rate of the compressor and the suction density.

The switching parameter and a switching condition are used to determine whether to change the volume ratio of the compressor 206. The switching condition may be, for example, a pressure ratio criterion. The pressure ratio criterion may provide a threshold value used to determine whether to switch the volume ratio of compressor. The pressure ratio criteria may be specific to the compressor, and the refrigerant used in the refrigeration circuit including the compressor. The pressure ratio criteria may be a function of the mass flow rate through the compressor. In an embodiment, the pressure ratio criterion is a linear function of the product of the suction density and the compressor speed. In an embodiment, the pressure ratio criterion is a linear function of the mass flow rate. In an embodiment, the mass flow rate is the product of the suction density and the compressor speed. In an embodiment, the mass flow rate is a product of the suction density and a volume flow rate. The switching parameter may be compared to the switching condition to determine whether to change the volume ratio of the compressor 206 via that comparison. The method 200 may be used with a variety of refrigerants in variable volume ratio compressor systems. In an embodiment, the refrigerant is refrigerant 134a (R134a). In an embodiment, the refrigerant is refrigerant 513A (R513A). In an embodiment, the refrigerant is refrigerant 1234ze (R1234ze). Parameters of the function such as constants may be determined by testing compressor efficiency over states of a variable volume ratio setting of the compressor across the operating map of a particular compressor.

The volume ratio of the compressor is changed at 208 when it is determined at 206 that the volume ratio is to be changed. The volume ratio can be changed from a first volume ratio to a second volume ratio. In an embodiment, the first and second volume ratios are two of multiple volume ratios. In an embodiment, the compressor switches from one of two volume ratios to the other of the two volume ratios. In an embodiment, the switching of compressor volume ratios occurs by operating one or more valves to change a source of pressure applied to a piston of the variable volume ratio system included in the compressor. In an embodiment, the source of pressure may be switched between an intermediate oil pressure of the compressor and a suction pressure of the compressor. In an embodiment, the volume ratio of the compressor is changed at 208, for example by operation of a stepper motor or by operation of a slide valve.

In compressor operations, the method 200 may further include, for example, delays to avoid constant switching and to confirm when to perform switching of the volume ratio. An example of such compressor operations is provided in FIG. 3.

Figure 3:
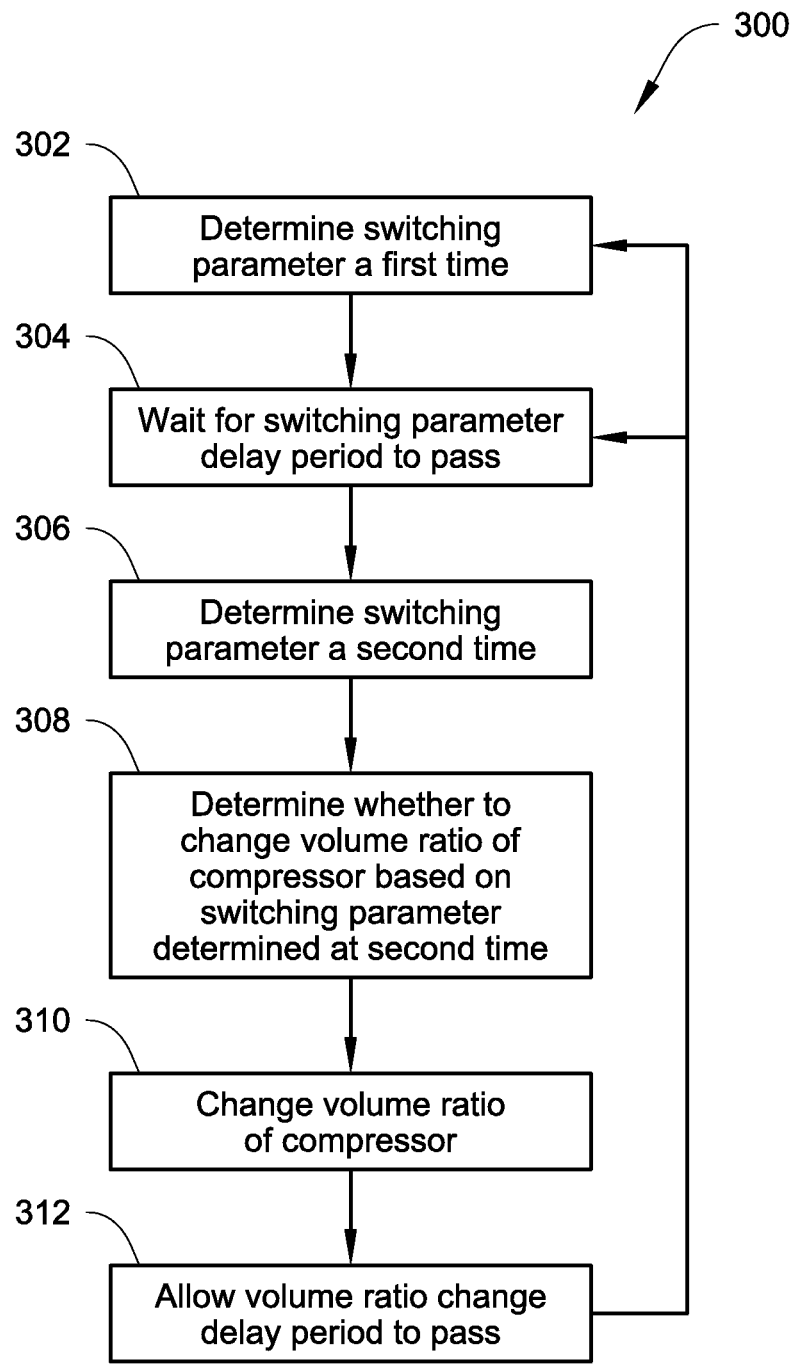
FIG. 3 shows a flowchart of an embodiment for controlling a compressor system.

FIG. 3 shows a flowchart of an example method 300 for controlling a compressor system according to an embodiment. In the method 300 shown in FIG. 3, the switching parameter is determined a first time 302. A delay period is allowed to pass 304. The switching parameter is determined a second time 306. It is determined, using the switching parameter determined at 306, whether the volume ratio of the compressor is to be changed 308. When it is determined at 308 that the volume ratio of the compressor is to be changed, the volume ratio of the compressor is changed 310. After the volume ratio of the compressor is changed at 310, a second delay period is allowed to pass 312 before returning to 302 or 304 and iterating method 300.

A switching parameter is determined at 302. The switching parameter may be a function of the compressor suction density and the compressor speed. The suction density and compressor speed may be obtained according to 202 described above and shown in FIG. 2. The switching parameter may be determined according to 204 described above and shown in FIG. 2.

After the switching parameter is determined at 302, a switching parameter delay period is allowed to pass 304. The switching parameter delay period is a period between a first determination of the switching parameter at 302 and a second determination of the switching parameter at 306. The switching parameter delay period of 304 may be used to prevent excessive switching frequencies, for example by reducing the number of switching events triggered by outlier results or transient conditions (e.g. erroneous sensor readings, spikes in temperature or pressure, or the like) for suction density. In an embodiment, the switching parameter delay of 304 is a period of time for an accumulating value to meet a target, for example integrating the compressor speed and suction density over time and ending the switching parameter delay period of 304 when that value meets a threshold. In an embodiment, the switching parameter delay period of 304 is approximately five (5) minutes.

Once the switching parameter delay period has passed 304, the switching parameter is determined a second time 306. The switching parameter is determined in the same manner as at 302, including obtaining the suction density and compressor speed according to 202 and determining the switching parameter according to 204.

The second determination of the switching parameter at 306 may be used to determine whether the volume ratio of the compressor is to be changed 308. Determining whether the volume ratio of the compressor is to be changed at 308 may be performed according to 206 described above and shown in FIG. 2, comparing the switching parameter as obtained at 306 to the switching condition.

When it is determined that the volume ratio of the compressor is to be changed at 308, the volume ratio of the compressor is changed at 310. The volume ratio of the compressor may be changed at 310 according to 208 described above and shown in FIG. 2.

Following the changing of the volume ratio at 310, the method 300 includes allowing a volume ratio change delay period to pass 312. In an embodiment, the volume ratio change delay period of 312 is a period between the implementation of the change to the volume ratio at 310 and determining the switching parameter for a first time at 302 in a subsequent iteration of method 300, for example, when the compressor speed and suction density values are obtained continuously. In an embodiment, the volume ratio change delay period may be variable based on, for example, the number of times the volume ratio has been changed according to 310 within a predefined time period. In an embodiment, the volume ratio change delay period is within a range from at or about one (1) minute to at or about one (1) hour. In an embodiment, the volume ratio change delay period of 312 is approximately fifteen (15) minutes Aspects:

It is understood that any of aspects 1-9 may be combined with any of aspects 10-19.

Aspect 1. A compressor system, comprising:
a variable volume ratio compressor configured to be operated at one of a plurality of different volume ratios and having a suction; and
a controller configured to:
obtain a speed of operation of the variable volume ratio compressor and a refrigerant density at the suction of the variable volume ratio compressor;
determine a switching parameter based on the speed of operation and the refrigerant density; determine whether to change a volume ratio of the variable volume ratio compressor based on a switching condition and the switching parameter; and
when it is determined to change the volume ratio, direct a change in the volume ratio that the variable volume ratio compressor is operated at.

Aspect 2. The compressor system according to aspect 1, wherein the plurality of different volume ratios is two different volume ratios.

Aspect 3. The compressor system according to any of aspects 1-2, further comprising one or more sensors located at the suction of the variable volume ratio compressor, and wherein the controller obtains the refrigerant density based on outputs from the one or more sensors.

Aspect 4. The compressor system according to aspects 3, wherein the outputs from the one or more sensors include a suction pressure and a suction temperature.

Aspect 5. The compressor system according to any of aspects 1-4, wherein the switching parameter determined by the controller is a product of the speed of operation and the refrigerant density.

Aspect 6. The compressor system according to any of aspects 1-5, wherein the switching condition is a linear function of the speed of operation and the refrigerant density.

Aspect 7. The compressor system according to any of aspects 1-6, further comprising a piston, a first valve, and a second valve, wherein the first valve is configured to control fluid communication between the piston and a first pressure source, the second valve is configured to control fluid communication between the piston and a second pressure source, different than the first pressure source, and the piston is configured to be positioned by a received pressure.

Aspect 8. The compressor system according to aspect 7, wherein the first pressure source is the suction of the variable volume ratio compressor and the second pressure source is intermediate point of the variable volume ratio compressor.

Aspect 9. The compressor system according to any of aspects 7-8, wherein the controller directs the change in the volume ratio that the variable volume ratio compressor by directing each of the first valve and the second valve to change positions.

Aspect 10. A method for controlling a variable volume ratio compressor, comprising:
obtaining a suction density and an operating speed of the variable volume ratio compressor;
determining a switching parameter based on the suction density and the operation speed; determining whether to change a volume ratio of the variable volume ratio compressor based on the switching parameter and a switching condition; and when it is determined to change then volume ratio of the variable volume ratio compressor, changing the volume ratio of the variable volume ratio compressor, wherein the switching parameter is a function of a suction density of the variable-volume ratio compressor and an operation speed of the compressor.

Aspect 11. The method according to aspect 10, wherein determining the switching parameter includes:
determining the switching parameter at a first time;
waiting a switching parameter delay period; and
determining the switching parameter at a second time, and wherein determining whether to change the volume ratio of the variable volume ratio compressor is based on the switching parameter determined at the second time.

Aspect 12. The method according to aspect 11, wherein the switching parameter delay period is approximately five (5) minutes.

Aspect 13. The method according to any of aspects 10-12, further comprising waiting a volume ratio change delay period after changing a volume ratio of the compressor.

Aspect 14. The method according to aspect 13, wherein the volume ratio change delay period is approximately fifteen (15) minutes.

Aspect 15. The method according to any of aspects 10-14, wherein the switching parameter is a product of the suction density and the operating speed of the variable volume ratio compressor.

Aspect 16. The method according to any of aspects 10-15, wherein the switching condition is a linear function of the product of the suction density and the operating speed of the variable volume compressor.

Aspect 17. The method according to any of aspects 10-16, wherein changing the volume ratio of the variable volume ratio compressor includes switching the variable volume ratio compressor from a first volume ratio to a second volume ratio by changing the position of each of a first and a second valve, where the first valve is in fluid communication with a first pressure and the second valve is in fluid communication with a second pressure, different from the first pressure.

Aspect 18. The method according to aspect 17, wherein the first pressure is a suction pressure of the variable volume ratio compressor, and the second pressure is an intermediate pressure within the variable volume ratio compressor.

Aspect 19. The method according to any of aspects 17-18, wherein the first valve and the second valve are configured to provide one of either the first pressure or the second pressure to a piston within the variable volume ratio compressor.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A compressor system, comprising:
a variable volume ratio compressor configured to be operated at one of a plurality of different volume ratios and having a suction; and
a controller configured to:
obtain a speed of operation of the variable volume ratio compressor and a refrigerant density at the suction of the variable volume ratio compressor;
determine a switching parameter based on the speed of operation and the refrigerant density;
determine whether to change a volume ratio of the variable volume ratio compressor based on a switching condition and the switching parameter; and
when it is determined to change the volume ratio, direct a change in the volume ratio that the variable volume ratio compressor is operated at.

2. The compressor system of claim 1, wherein the plurality of different volume ratios is two different volume ratios.

3. The compressor system of claim 1, further comprising one or more sensors located at the suction of the variable volume ratio compressor, and wherein the controller obtains the refrigerant density based on outputs from the one or more sensors.

4. The compressor system of claim 3, wherein the outputs from the one or more sensors include a suction pressure and a suction temperature.

5. The compressor system of claim 1, wherein the switching parameter determined by the controller is a product of the speed of operation and the refrigerant density.

6. The compressor system of claim 1, wherein the switching condition is a linear function of the speed of operation and the refrigerant density.

7. The compressor system of claim 1, further comprising a piston, a first valve, and a second valve, wherein the first valve is configured to control fluid communication between the piston and a first pressure source, the second valve is configured to control fluid communication between the piston and a second pressure source, different than the first pressure source, and the piston is configured to be positioned by a received pressure.

8. The compressor system of claim 7, wherein the first pressure source is the suction of the variable volume ratio compressor and the second pressure source is an intermediate point of the variable volume ratio compressor.

9. The compressor system of claim 7, wherein the controller directs the change in the volume ratio that the variable volume ratio compressor is operated at by directing each of the first valve and the second valve to change positions.

10. A method for controlling a variable volume ratio compressor, comprising:
obtaining a suction density and an operating speed of the variable volume ratio compressor;
determining a switching parameter based on the suction density and the operation speed;
determining whether to change a volume ratio of the variable volume ratio compressor based on the switching parameter and a switching condition; and
when it is determined to change the volume ratio of the variable volume ratio compressor, changing the volume ratio of the variable volume ratio compressor,
wherein the switching parameter is a function of a suction density of the variable-volume ratio compressor and an operation speed of the compressor.

11. The method of claim 10, wherein determining the switching parameter includes:
determining the switching parameter at a first time;
waiting a switching parameter delay period; and
determining the switching parameter at a second time, and
wherein determining whether to change the volume ratio of the variable volume ratio compressor is based on the switching parameter determined at the second time.

12. The method of claim 11, wherein the switching parameter delay period is approximately five (5) minutes.

13. The method of claim 10, further comprising waiting a volume ratio change delay period after changing a volume ratio of the compressor.

14. The method of claim 13, wherein the volume ratio change delay period is approximately fifteen (15) minutes.

15. The method of claim 10, wherein the switching parameter is a product of the suction density and the operating speed of the variable volume ratio compressor.

16. The method of claim 10, wherein the switching condition is a linear function of the product of the suction density and the operating speed of the variable volume compressor.

17. The method of claim 10, wherein changing the volume ratio of the variable volume ratio compressor includes switching the variable volume ratio compressor from a first volume ratio to a second volume ratio by changing the position of each of a first and a second valve, where the first valve is in fluid communication with a first pressure and the second valve is in fluid communication with a second pressure, different from the first pressure.

18. The method of claim 17, wherein the first pressure is a suction pressure of the variable volume ratio compressor, and the second pressure is an intermediate pressure within the variable volume ratio compressor.

19. The method of claim 17, wherein the first valve and the second valve are configured to provide one of either the first pressure or the second pressure to a piston within the variable volume ratio compressor.

* * * * *